United States Patent
Zhang et al.

(10) Patent No.: US 10,947,374 B2
(45) Date of Patent: Mar. 16, 2021

(54) SOUND INSULATION COMPOSITION AND SOUND INSULATION SHEET FOR VEHICLE

(71) Applicant: BYD COMPANY LIMITED, Shenzhen (CN)

(72) Inventors: Min Zhang, Shenzhen (CN); Xinping Lin, Shenzhen (CN); Yaxuan Sun, Shenzhen (CN); Mingshuang Zhou, Shenzhen (CN); Xiong Zhou, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 358 days.

(21) Appl. No.: 15/781,304

(22) PCT Filed: Dec. 21, 2016

(86) PCT No.: PCT/CN2016/111363
§ 371 (c)(1),
(2) Date: Jun. 4, 2018

(87) PCT Pub. No.: WO2017/107928
PCT Pub. Date: Jun. 29, 2017

(65) Prior Publication Data
US 2018/0319969 A1 Nov. 8, 2018

(30) Foreign Application Priority Data

Dec. 25, 2015 (CN) .......................... 201510988207.9

(51) Int. Cl.
| | |
|---|---|
| *C08L 23/16* | (2006.01) |
| *B60R 13/08* | (2006.01) |
| *C08K 13/06* | (2006.01) |
| *C08K 3/30* | (2006.01) |
| *C08K 3/26* | (2006.01) |
| *C08K 9/06* | (2006.01) |
| *C08L 91/06* | (2006.01) |
| *C08K 3/34* | (2006.01) |
| *C08L 51/06* | (2006.01) |
| *C08L 91/00* | (2006.01) |
| *C08K 5/00* | (2006.01) |
| *C08L 23/06* | (2006.01) |
| *C08K 3/04* | (2006.01) |
| *C08K 13/02* | (2006.01) |
| *C08K 3/38* | (2006.01) |

(52) U.S. Cl.
CPC .............. *C08L 23/16* (2013.01); *B60R 13/08* (2013.01); *C08K 3/04* (2013.01); *C08K 3/26* (2013.01); *C08K 3/30* (2013.01); *C08K 3/34* (2013.01); *C08K 5/0025* (2013.01); *C08K 5/0066* (2013.01); *C08K 9/06* (2013.01); *C08K 13/02* (2013.01); *C08K 13/06* (2013.01); *C08L 23/06* (2013.01); *C08L 51/06* (2013.01); *C08L 91/00* (2013.01); *C08L 91/06* (2013.01); *C08K 2003/3045* (2013.01); *C08K 2003/385* (2013.01); *C08L 2201/02* (2013.01); *C08L 2205/025* (2013.01); *C08L 2205/03* (2013.01); *C08L 2205/08* (2013.01)

(58) Field of Classification Search
CPC ..................................................... B60R 13/08
See application file for complete search history.

(56) References Cited

U.S. PATENT DOCUMENTS

| | | | |
|---|---|---|---|
| 4,501,841 | A | 2/1985 | Herring |
| 4,663,065 | A | 5/1987 | Herring |
| 2003/0065102 | A1 | 4/2003 | Jourdain et al. |
| 2004/0214958 | A1 | 10/2004 | Jourdain et al. |
| 2006/0116460 | A1 | 6/2006 | Georget et al. |

FOREIGN PATENT DOCUMENTS

| | | | |
|---|---|---|---|
| CN | 1665679 | A | 9/2005 |
| CN | 1793211 | A | 6/2006 |
| CN | 102501504 | A | 6/2012 |
| CN | 103030875 | A | 4/2013 |
| CN | 103108779 | A | 5/2013 |
| CN | 103288481 | A | 9/2013 |
| CN | 103756109 | A | 4/2014 |
| CN | 103937061 | A | 7/2014 |
| CN | 103951321 | A | 7/2014 |
| EP | 271867 | * | 6/1988 |
| EP | 0271867 | A1 | 6/1988 |
| EP | 1245623 | A1 | 10/2002 |
| EP | 1403330 | A1 | 3/2004 |
| EP | 1500690 | A1 | 1/2005 |
| EP | 2810985 | A1 | 12/2014 |
| WO | 0069930 | A1 | 11/2000 |
| WO | 0104198 | A1 | 1/2001 |
| WO | WO 01/4198 | * | 1/2001 |

* cited by examiner

OTHER PUBLICATIONS

The World Intellectual Property Organization (WIPO) International Search Report and Written Opinion for PCT/CN2016/111363 dated Mar. 31, 2017 6 Pages.

*Primary Examiner* — C Melissa Koslow
(74) *Attorney, Agent, or Firm* — Anova Law Group, PLLC

(57) ABSTRACT

A sound insulation composition and a sound insulation sheet for a vehicle are provided. The sound insulation composition includes 50 to 300 parts by weight of EPDM rubber, 10 to 300 parts by weight of mica powers, 10 to 300 parts by weight of dolomite, 2 to 15 parts by weight of a vulcanizing agent, 3 to 60 parts by weight of a compatilizer, 30 to 300 parts by weight of a fire retardant, 0.2 to 3 parts by weight of a cross-linking agent, 10 to 80 parts by weight of a plasticizer, and 100 to 500 parts by weight of barium sulfate. The sound insulation sheet for the vehicle is made of the sound insulation composition mentioned above.

16 Claims, No Drawings

SOUND INSULATION COMPOSITION AND SOUND INSULATION SHEET FOR VEHICLE

CROSS-REFERENCE TO RELATED APPLICATION

This application is a national phase entry under 35 U.S.C. § 371 of International Application No. PCT/CN2016/111363, filed on Dec. 21, 2016, which claims priority to and benefits of Chinese Patent Application Serial No. 201510988207.9, filed with the State Intellectual Property Office of P. R. China on Dec. 25, 2015, the entire content of all of which is incorporated herein by reference

TECHNICAL FIELD

The present disclosure relates to a field of vehicle components, especially relates to a sound insulation composition and a sound insulation sheet for a vehicle.

BACKGROUND

Nowadays, since fossil energy is limited and environment problems caused by vehicle exhaust, thereby electric and hybrid vehicles are becoming new development directions. Accordingly, an electric motor and other sounding components of an electric vehicle have put forward higher requirements to NVH (Noise, Vibration, Harshness) performance of the vehicle. Especially a high frequency part of the noise is more prominent, so that it has also put forward higher requirements to noise reduction materials.

In the prior art, PVC (polyvinyl chloride) or EVA (ethylene-vinyl acetate) resins has been widely used as a substrate in a sound insulation sheet for a vehicle, the sound insulation sheet is prepared by adding a mixture of single flake fillers or common inorganic fillers. However, the sound insulation effect of such materials cannot meet the requirements of low frequency or super-high frequency noise generated by electric vehicle for the sound insulation materials. It generally impedes the transmission of sound energy in the way of sound transmitting in the prior art, so as to achieve the effect of reducing noise.

SUMMARY

The present disclosure provides a sound insulation composition prepared by adding flake-shaped mica powers and block-shaped dolomite simultaneously to a sound insulation substrate of EPDM (Ethylene Propylene Diene Monomer) rubber. On one hand, since the flake-shaped mica powers and block-shaped dolomite have different elastic modulus from the EPDM rubber, so that different strains are generated in these components, thus generating relative strains when they constitute the sound insulation composition, therefore additional energy consumption in the sound insulation composition may be generated. On the other hand, because of presence of the flake-shaped mica powers and block-shaped dolomite, there is a plurality of pores inside the sound insulation composition, and the presence of these pores may improve sound absorption and sound insulation effects of the sound insulation composition. Meanwhile, the EPDM rubber has a good damping capacity, and it may be mixed with the flake-shaped mica powers and block-shaped dolomite, so as to further improve a damping capacity, an effect of sound insulation and a freeze resistance of a sound insulation sheet.

The sound insulation composition of present disclosure includes 50 to 300 parts by weight of EPDM rubber, 10 to 300 parts by weight of mica powers, 10 to 300 parts by weight of dolomite, 2 to 15 parts by weight of a vulcanizing agent, 3 to 60 parts by weight of a compatilizer, 30 to 300 parts by weight of a fire retardant, 0.2 to 3 parts by weight of a cross-linking agent, 10 to 80 parts by weight of a plasticizer, and 100 to 500 parts by weight of barium sulfate.

The present disclosure also provides a sound insulation sheet for a vehicle, the sound insulation sheet is prepared by mixing, extruding, pressing and vulcanizing the sound insulation composition according to present disclosure.

After a lot of experiments have been done, inventors of the present disclosure found out that the sound insulation sheet prepared by adding the flake-shaped mica powers and block-shaped dolomite at the same time in the EPDM rubber substrate has favorable effect of vibration absorption and sound insulation. Because the flake-shaped mica powers and block-shaped dolomite have different elastic modulus from the EPDM rubber, different strains may be generated in these components, thus generating relative strains when they constitute a sound insulation composition, therefore additional energy consumption in the sound insulation composition are generated, so as to improve the sound insulation performance. The inventors also found in the experiments that the flake-shaped mica powers and block-shaped dolomite are mixed and added in an EPDM rubber substrate, and because of the presence of the flake-shaped mica powers and block-shaped dolomite, a plurality of pores may be formed in the sound insulation composition, so as to improve sound absorption and insulation effects of the sound insulation composition. Meanwhile, the EPDM rubber has a good damping capacity, and it may be mixed with the flake-shaped mica powers and block-shaped dolomite, so as to further improve the damping capacity, the effect of sound insulation and the freeze resistance of the sound insulation sheet. The inventors also have found that the sound insulation sheet, which is made of the sound insulation composition obtained by mixing the EPDM rubber, the flaked-shaped mica powers, blocked-shaped dolomite, the vulcanizing agent, the compatilizer, the fire retardant, the cross-linking agent, the plasticizer and barium sulfate in a ratio described by the present disclosure, not only have favorable damping and sound insulation effects, but also have favorable mechanical strength, hardness, freeze resistance and fire resistance.

DETAILED DESCRIPTION

Reference will be made in detail to embodiments of the present disclosure. The embodiments described herein are explanatory, illustrative, and used to generally understand the present disclosure. The embodiments shall not be construed to limit the present disclosure.

The present disclosure provides a sound insulation composition, including 50 to 300 parts by weight of EPDM rubber, 10 to 300 parts by weight of mica powers, 10 to 300 parts by weight of dolomite, 2 to 15 parts by weight of a vulcanizing agent, 3 to 60 parts by weight of a compatilizer, 30 to 300 parts by weight of a fire retardant, 0.2 to 3 parts by weight of a cross-linking agent, 10 to 80 parts by weight of a plasticizer, and 100 to 500 parts by weight of barium sulfate.

The inventors found out that the sound insulation composition prepared by filling the flake-shaped mica powers and block-shaped dolomite in an EPDM rubber substrate, has a favorable effect of sound insulation, meanwhile the flake-shaped mica powers and block-shaped dolomite have a good compatibility with the EPDM rubber. Because of the presence of the vulcanizing agent and the cross-linking agent, the EPDM rubber has a complete cross-linked network structure, so as to ensure the mechanical strength, hardness and freeze resistance of the sound insulation composition. Because of the compatilizer, the EPDM rubber can be better mixed with the mica powders and dolomite.

In some embodiments, an average particle size of the mica powers is 100 to 800 mesh. In some embodiments, an average particle size of dolomite is 100 to 800 mesh.

The average particle size of the mica powders is defined to be 100 to 800 mesh and the average particle size of the dolomite is defined to be 100 to 800 mesh, so as to guarantee favorable compatibility among the mica powders, dolomite and the EPDM rubber, at the same time the interactions among the mica powders, dolomite and EPDM become more obvious, the sound insulation composition has greater energy consumption, and the sound insulation sheet prepared thereby has favorable effect of sound insulation.

In some embodiments, a weight ratio of the mica powers to the dolomite is 1:9 to 9:1. The flake-shaped mica powers and block-shaped dolomite are controlled within such a weight ratio, so that the mica powers, dolomite and the EPDM rubber may be better interacted, and the sound insulation composition has favorable damping capacity and sound insulation effect.

In some embodiments, the plasticizer is paraffin oil, so as to improve the processability of the sound insulation composition and increase the hardness of the sound insulation sheet. In some embodiments, the sound insulation composition according to present disclosure also includes 5 to 20 parts by weight of carbon black, and the carbon black used as a pigment is safe and has no smell, no pollution and low cost.

In some embodiments, the compatilizer can be selected from one or more of EPDM grafted polymers. In some embodiments, the compatilizer is maleic anhydride grafted EPDM, so as to further improve the compatibility of inorganic fillers and the EPDM rubber, and make the inorganic fillers disperse more evenly in the EPDM rubber.

In some embodiments, the vulcanizing agent is selected from one or more of dicumyl peroxide, bis(tert-butyl peroxy isopropyl)benzene and 2,5-dimethyl-2,5-bis(tert-butyl peroxide) hexane. The cross-linking agent is selected from at least one of triallyl cyanurate and triallyl isocyanurate. Such vulcanizing agent is used and has no smell, meanwhile the EPDM rubber may have a complete cross-linked network structure formed after vulcanizing, so that the sound insulation sheet prepared has desired freeze resistance and mechanical strength. The selected cross-linking agent may improve the cross-linking density and the mechanical property of the sheet, and reduce the odor of vulcanized rubber effectively as well.

In some embodiments, the fire retardant is a halogen-free fire retardant. In some embodiments, the halogen-free fire retardant is selected from one or more of zinc borate, magnesium hydroxide, aluminum hydroxide, red phosphorus and a smoke suppressant. Such fire retardant may be used to achieve a high fire-retardant grade.

In some embodiments, the sound insulation composition according to present disclosure may also include an additional agent. The additional agent is selected from one or more of a softener, an antioxidant, and/or a lubricant, according to actual situations. The types and the amounts of the softener, the inhibitor and the lubricant are within a general range of this field, which are not limited in present disclosure and are no more described in detail.

The present disclosure also provides a sound insulation sheet for a vehicle, the sound insulation sheet prepared by mixing, extruding, pressing and vulcanizing the sound insulation composition according to the present disclosure. In the process of mixing, the inorganic fillers, auxiliary agent and the EPDM rubber are sufficiently mixed and dispersed. In the process of extruding and pressing, the sound insulation sheet with uniform thickness may be obtained. The added vulcanizing agent is safe and has no smell, and the EPDM rubber after being vulcanized has a complete cross-linked network structure. The sound insulation sheet prepared has desired freeze resistance and mechanical strength, and high density of the sheet may be achieved. In some embodiments, a surface pre-treatment of dolomite is carried out before mixing. In some embodiments, the method of surface pre-treatment of dolomite is mixing dolomite, barium sulfate and a silane coupling agent or a titanate coupling agent in an electric heating high speed mixing machine at a mixing temperature of 100 to 120° C. for a mixing time of 0.5 to 1 h.

Specifically, a condition of mixing includes: a mixing temperature of 100 to 120° C., and a mixing time of 10 to 30 min. An extruding condition includes: an extruding temperature of 90 to 110° C. A vulcanizing condition includes: a vulcanizing temperature of 150 to 170° C., and a vulcanizing time of 6 to 10 min.

In some embodiments, the sound insulation sheet according to present disclosure may be prepared as follows: specifically, dolomite, barium sulfate and the silane coupling agent are first mixed in a mixing machine and the surface pre-treatment of dolomite is accomplished in the process of mixing; then, the plasticizer and the mica powers after being evenly mixed are transferred in a mixing machine (e.g., a mixer such as a Banbury® mixer) together with EPDM rubber, the compatilizer, the vulcanizing agent, the fire retardant, the cross-linking agent and the plasticizer to perform mixing; mixture after mixing is extruded, thus obtaining a sheet is obtained; the obtained sheet is vulcanized through a baking path, thus obtaining the sound insulation sheet of present disclosure, in which, a mixing temperature is 100 to 120° C., and a mixing time is 10 min to 30 min; an extruding condition includes: an extruding temperature of 90° C. to 110° C.; and a vulcanizing condition includes: a vulcanizing temperature of 150 to 170° C., and a vulcanizing time is 6 to 10 min.

The aforementioned features and advantages of the present disclosure as well as the additional features and advantages thereof will be further clearly understood hereafter as a result of a detailed description of the following examples.

Example 1

(1) 8 kg dolomite (an average particle size of dolomite is 200 mesh), 60 kg barium sulfate and 0.5 kg silane coupling agent were weighed and mixed in a mixing machine at a temperature of 110° C. for 5 min.

(2) 10 kg mica powers (an average particle size of the mica powers is 325 mesh), 3 kg paraffin oil were weighed and mixed evenly in a plastic container.

(3) 20 kg EPDM rubber, 1 kg maleic anhydride grafted EPDM, 20 kg fire retardant (including 6 kg zinc borate, 12 kg aluminum hydroxide, 1.8 kg red phosphorus, 0.2 kg ammonium octamolybdate), 1 kg carbon black, 1 kg vulcanizing agent (BIBP96), 0.5 kg cross-linking agent (triallyl cyanurate) and 3.8 kg a mixture of stearic acid, zinc stearate, zinc oxide, calcium oxide and inhibitor (anti-aging agent 4010) were weighed, disposed in a Banbury® mixing machine together with mixtures of step (1) and step (2) to perform mixing, in which a temperature in the mixing machine was set at 120° C. and a mixing time was set for 15 min.

(4) Mixture obtained after mixing of the step (3) was fed automatically in a double forced feeding hopper, and extruded to be a sheet at a temperature of 90° C., and the extruded sheet was pressed and polished by a calender so as to obtain a sample having a thickness of 2 mm thickness and a width of 1.3 m.

(5) The sample obtained of the step (4) was vulcanized through a baking passage with a certain speed at a vulcanizing temperature of 170° C. for 8 min. Then the sample was cut into a size of 1.3 m×10 m, thus obtaining a sound insulation sheet A1 of Example 1.

Example 2

A method used to prepare the sound insulation sheet A2 of Example 2 is the same as Example 1 expect for differences that the average particle size of dolomite in step (1) is 600 mesh and the average particle size of the mica powers in step (2) is 600 mesh.

Example 3

A method used to prepare the sound insulation sheet A3 of Example 3 is the same as Example 1 expect for differences that the average particle size of dolomite in step (1) is 200 mesh and the average particle size of the mica powers in step (2) is 600 mesh.

Example 4

A method used to prepare the sound insulation sheet A4 of Example 4 is the same as Example 1 expect for differences that the weight of dolomite is 12 kg and the weight of the barium sulfate is 40 kg in step (1), the weight of mica powers is 6 kg in step (2), and the weight of EPDM rubber is 25 kg in step (3). The other preparation conditions are the same as the Example 1.

Example 5

A method used to prepare the sound insulation sheet A5 of Example 5 is the same as Example 1 expect for differences that the weight of dolomite is 10 kg and the weight of the barium sulfate is 40 kg in step (1), the weight of mica powers is 6 kg in step (2), and the weight of EPDM rubber is 20 kg in step (3). The other preparation conditions are the same as the Example 1.

Example 6

A method used to prepare the sound insulation sheet A6 of Example 6 is the same as Example 1 expect for differences that the weight of dolomite is 4 kg and the weight of the barium sulfate is 48 kg in step (1) and the weight of mica powers is 8 kg in step (2). The other preparation conditions are the same as the Example 1.

Example 7

A method used to prepare the sound insulation sheet A7 of Example 7 is the same as Example 1 expect for differences that the weight of dolomite is 2 kg and the average particle size of dolomite is 100 mesh in step (1) and the weight of the mica powers is 18 kg and the average particle size of the mica powers is 800 mesh in step (2). The other preparation conditions are the same as the Example 1.

Example 8

A method used to prepare the sound insulation sheet A8 of Example 8 is the same as Example 1 expect for differences that the weight of dolomite is 18 kg and the average particle size of dolomite is 800 mesh in step (1), the weight of the mica powers is 2 kg and the average particle size of the mica powers is 100 mesh in step (2). The other preparation conditions are the same as the Example 1.

Example 9

A method used to prepare the sound insulation sheet A9 of Example 9 is the same as Example 1 expect for differences that the weight of dolomite is 2 kg and the average particle size of dolomite is 80 mesh in step (1), the weight of the mica powers is 20 kg and the average particle size of the mica powers is 80 mesh in step (2). The other preparation conditions are the same as the example 1.

Example 10

A method used to prepare the sound insulation sheet A10 of Example 10 is the same as Example 1 expect for differences that the weight of dolomite is 20 kg and the average particle size of dolomite is 900 mesh in step (1), the weight of the mica powers is 2 kg and the average particle size of the mica powers is 900 mesh in step (2). The other preparation conditions are the same as the Example 1.

Comparative Example 1

20 kg EPDM rubber, 60 kg barium sulfate, 10 kg calcium carbonate, 20 kg magnesium hydroxide, 3 kg paraffin oil, 1 kg carbon black, 1 kg vulcanizing agent (BIBP96), 0.5 kg cross-linking agent (triallyl cyanurate), and 3.8 kg mixture of stearic acid, zinc stearate, zinc oxide, calcium oxide and inhibitor (anti-aging agent 4010) were weighed and disposed in a mixing machine to perform mixing, in which a temperature of the mixing machine was set at 120° C. and a mixing time was set for 15 min. Mixture obtained after mixing was fed automatically in a double forced feeding hopper, and extruded to be a sheet at a temperature of 90° C., and the extruded sheet was pressed and polished by a calender so as to obtain a sample having a thickness of 2 mm and a width of 1.3 m. Such sample is vulcanized through a baking passage with a certain speed at a vulcanizing temperature of 170° C. for a vulcanizing time of 8 min. Then the sample was cut into a size of 1.3 m×10 m, thus obtaining the sound insulation sheet DA1 of Comparative Example 1.

Comparative Example 2

A method used to prepare the sound insulation sheet DA2 of Comparative Example 2 is the same as Comparative Example 1 expect for a difference that there is no addition of dolomite.

Comparative Example 3

A method used to prepare the sound insulation sheet DA3 of Comparative Example 3 is the same as Comparative Example 1 expect for a difference that there is no addition of mica powers.

Performance Tests (1) Acoustic Insulation Mass Measurement

Sound insulation performances of the sound insulation sheets A1 to A10 and DA1 to DA3 are measured according to a transfer function method disclosed in accordance with GB/T 18696.2-2002. Measuring results are shown in Table 1.

(2) Tensile Strength Measurement

Tensile strengths of the sound insulation sheets A1 to A10 and DA1 to DA3 are measured according to a method disclosed in accordance with GB/T 1040-2006. Measuring results are shown in Table 2.

(3) Combustion Performance Measurement

Combustion performances of the sound insulation sheets A1 to A10 and DA1 to DA3 are measured according to a vertical combustion method for combustion performance of plastics disclosed in accordance with GB/T 8410-2006 and GB/T2408.2-2008. Measuring results are shown in Table 2.

(4) Oxygen Index Measurement

Oxygen indexes of the sound insulation sheets A1 to A10 and DA1 to DA3 are measured according to an oxygen index method for plastics disclosed in accordance with GB/T2406.2-2009. Measuring results are shown in Table 2.

(5) Smoke Density Measurement

Smoke densities of the sound insulation sheets A1 to A10 and DA1 to DA3 are measured according to an experimental method of smoke density for burning or decomposing building materials disclosed in accordance with GB/T8627-2007. Measuring results are shown in Table 2.

TABLE 1

| ⅓ octave mid frequency (HZ) | Acoustic Insulation Mass (db) | | | | | | | | | | | | |
| --- | --- | --- | --- | --- | --- | --- | --- | --- | --- | --- | --- | --- | --- |
| | A1 | A2 | A3 | A4 | A5 | A6 | A7 | A8 | A9 | A10 | DA1 | DA2 | DA3 |
| 250 | 19.4 | 26.67 | 19.7 | 25.6 | 24.9 | 23.8 | 23.69 | 15.17 | 19.75 | 19.5 | 18.9 | 14.21 | 15.2 |
| 315 | 20.9 | 22 | 24.7 | 18.3 | 26.2 | 18.7 | 17.19 | 20.8 | 23.67 | 23.2 | 22.4 | 22.73 | 23.57 |
| 400 | 24.7 | 23.4 | 18.9 | 21.9 | 20.4 | 20.2 | 22.64 | 24.47 | 27.87 | 25.6 | 26.5 | 21.82 | 21.26 |
| 500 | 30.97 | 27.34 | 22.8 | 25.8 | 25.2 | 24.6 | 26.19 | 29.19 | 26.67 | 28.6 | 23.9 | 24.4 | 26.64 |
| 630 | 25.1 | 29.02 | 26.7 | 26.99 | 27.9 | 27.8 | 28.55 | 25.92 | 28.52 | 27.6 | 27.3 | 28.19 | 27.35 |
| 800 | 28 | 28.48 | 30.7 | 27.45 | 28.3 | 25.9 | 27.35 | 30.37 | 31.34 | 30.3 | 29.5 | 26.5 | 27.65 |
| 1000 | 32.1 | 34.15 | 28.5 | 30.33 | 30.4 | 31.2 | 31.88 | 34.92 | 32.34 | 32.7 | 30.9 | 29.55 | 29.89 |
| 1250 | 33.3 | 33.61 | 32.1 | 30.3 | 33.2 | 32.5 | 33.01 | 33.54 | 34.47 | 32.7 | 32.5 | 30.17 | 33.2 |
| 1600 | 40.2 | 38.15 | 38.6 | 36.5 | 38 | 37.7 | 37.52 | 26.16 | 39.17 | 37.2 | 39.8 | 35.98 | 24.6 |
| 2000 | 46.3 | 40.89 | 38.8 | 38.9 | 42.5 | 41.4 | 38.63 | 42.94 | 31.81 | 40.6 | 33.96 | 24.58 | 31.9 |
| 2500 | 50.8 | 47.66 | 47.5 | 43.69 | 47.5 | 46.6 | 44.07 | 31.54 | 35.33 | 33.1 | 32.98 | 28.4 | 35.28 |
| 3150 | 54.4 | 39.53 | 52.3 | 36 | 42.1 | 41.1 | 37.96 | 39.91 | 41.2 | 38.6 | 38.5 | 36.49 | 35.43 |
| 4000 | 59.1 | 40.65 | 46.1 | 35.5 | 41.5 | 43.5 | 32.86 | 48.86 | 30.75 | 36.9 | 38.3 | 26.67 | 35.57 |
| 5000 | 55.9 | 44.71 | 47.2 | 45 | 46.8 | 48.3 | 44.07 | 40.66 | 41.57 | 41.4 | 39.9 | 35.86 | 40.18 |
| 6300 | 54.4 | 44.71 | 54.2 | 43.4 | 51.4 | 50.1 | 45.31 | 42.21 | 43.81 | 44.3 | 41.98 | 36.65 | 40.12 |
| Average acoustic insulation mass Ra | 38.37 | 34.73 | 35.25 | 32.38 | 35.09 | 34.23 | 32.73 | 32.44 | 32.55 | 32.82 | 31.82 | 28.15 | 29.86 |

TABLE 2

| Sample number | Shore hardness/ HLD | Tensile strength (Mpa) | Fire retardant property | Areal density kg/m² | Oxygen index | Smoke density grade SRD |
| --- | --- | --- | --- | --- | --- | --- |
| A1 | 79.5 | 4.6 | Burning for 15 seconds, extinguishing out of the fire, incapable of igniting, A-0. Vertical combustion: v-0. | 4.37 | 37.8 | 27.5 |
| A2 | 76 | 4.5 | Burning for 15 seconds, extinguishing out of the fire, incapable of igniting, A-0. Vertical combustion: v-0. | 4.26 | 36.8 | 27.0 |
| A3 | 75 | 4.3 | Burning for 15 seconds, extinguishing out of the fire, incapable of igniting, A-0. Vertical combustion: v-0. | 4.3 | 37.2 | 26.5 |
| A4 | 81 | 3.5 | Burning for 15 seconds, extinguishing out of the fire, incapable of igniting, A-0. Vertical combustion: v-0. | 3.79 | 35.2 | 25.0 |
| A5 | 73 | 3.6 | Burning for 15 seconds, extinguishing out of the fire, incapable of igniting, A-0. Vertical combustion: v-0. | 3.98 | 36.2 | 26.5 |
| A6 | 76 | 4.2 | Burning for 15 seconds, extinguishing out of the fire, incapable of igniting, A-0. Vertical combustion: v-0. | 4.1 | 35.8 | 27.5 |
| A7 | 82 | 4.2 | Burning for 15 seconds, extinguishing out of the fire, incapable of igniting, A-0. Vertical combustion: v-0. | 3.84 | 36.7 | 27.5 |
| A8 | 78 | 3.4 | Burning for 15 seconds, extinguishing out of the fire, incapable of igniting, A-0. Vertical combustion: v-0. | 3.98 | 36.4 | 25 |

TABLE 2-continued

| Sample number | Shore hardness/ HLD | Tensile strength (Mpa) | Fire retardant property | Areal density kg/m² | Oxygen index | Smoke density grade SRD |
|---|---|---|---|---|---|---|
| A9 | 79 | 2.5 | Burning for 15 seconds, extinguishing out of the fire, incapable of igniting, A-0. Vertical combustion: v-0. | 4.08 | 37.5 | 26.5 |
| A10 | 80 | 3.7 | Burning for 15 seconds, extinguishing out of the fire, incapable of igniting, A-0. Vertical combustion: v-0. | 3.7 | 36.5 | 27 |
| DA1 | 75 | 3.0 | Incapable of igniting, A-0. Vertical combustion: v-1. | 4.1 | 29.8 | 10 |
| DA2 | 73 | 3.7 | Incapable of igniting, A-0. Vertical combustion: v-0. | 3.64 | 37.9 | 28.6 |
| DA3 | 76 | 2.8 | Incapable of igniting, A-0. Vertical combustion: v-0. | 3.59 | 35 | 27.2 |

Notes:
A-0: Fire retardant grade of the Chinese standard GB/T 8410-2006.
v-0, v-1: Fire retardant grade of the American standard ANSI/UL94-1985.

As shown in Table 1, the sound insulation sheets prepared by simultaneously adding the flake-shaped mica powers and block-shaped dolomite in the sound insulation composition of the present disclosure have better sound insulation effects compared to the sound insulation sheets of comparative example 1 to 3 prepared by the sound insulation composition without simultaneously adding the flake-shaped mica powers and block-shaped dolomite, especially in a high frequency band. The acoustic insulation masses of embodiments of the present disclosure are far greater than the acoustic insulation masses of the comparative examples.

As shown in Table 2, the sound insulation sheets prepared by the sound insulation compositions of embodiments of the present disclosure may ensure a desired sound insulation effect, and at the same time may have a desired fire-retardant property, a mechanical strength, a low smoke density and a high oxygen index.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A sound insulation material composition, comprising:
50 to 300 parts by weight of EPDM rubber,
10 to 300 parts by weight of mica powers,
10 to 300 parts by weight of dolomite,
2 to 15 parts by weight of a vulcanizing agent,
3 to 60 parts by weight of a compatilizer,
30 to 300 parts by weight of a fire retardant,
0.2 to 3 parts by weight of a cross-linking agent,
10 to 80 parts by weight of a plasticizer, and
100 to 500 parts by weight of barium sulfate.

2. The sound insulation composition according to claim 1, wherein an average particle size of the mica powers is 100 to 800 mesh.

3. The sound insulation composition according to claim 1, wherein an average particle size of dolomite is 100 to 800 mesh.

4. The sound insulation composition according to claim 1, wherein a weight ratio of the mica powers to the dolomite is 1:9 to 9:1.

5. The sound insulation composition according to claim 1, wherein the plasticizer is paraffin oil.

6. The sound insulation composition according to claim 1, further comprising 5 to 20 parts by weight of carbon black.

7. The sound insulation composition according to claim 1, wherein the compatilizer is a maleic anhydride grafted EPDM.

8. The sound insulation composition according to claim 1, wherein the vulcanizing agent is selected from one or more of dicumyl peroxide, bis(tert-butyl peroxy isopropyl)benzene and a 2,5-dimethyl-2,5-bis(tert-butyl peroxide) hexane.

9. The sound insulation composition according to claim 1, wherein the cross-linking agent is selected from at least one of triallyl cyanurate and triallyl isocyanurate.

10. The sound insulation composition according to claim 1, wherein the fire retardant is a halogen-free fire retardant.

11. The sound insulation composition according to anyone of claim 10, wherein the halogen-free fire retardant is selected from one or more of zinc borate, magnesium hydroxide, aluminum hydroxide, red phosphorus and a smoke suppressant.

12. The sound insulation composition according to claim 1, further comprising an additional agent.

13. The sound insulation composition according to claim 12, wherein the additional agent is selected from one or more of a softener, an inhibitor and a lubricant.

14. A sound insulation sheet for a vehicle, wherein the sound insulation sheet is prepared by mixing, extruding, pressing and vulcanizing a sound insulation composition, and the insulation composition includes:
50 to 300 parts by weight of EPDM rubber,
10 to 300 parts by weight of mica powers,
10 to 300 parts by weight of dolomite,
2 to 15 parts by weight of a vulcanizing agent,
3 to 60 parts by weight of a compatilizer,
30 to 300 parts by weight of a fire retardant,
0.2 to 3 parts by weight of a cross-linking agent,
10 to 80 parts by weight of a plasticizer, and
100 to 500 parts by weight of barium sulfate.

15. The sound insulation sheet according to claim 14, wherein a surface pretreatment of dolomite is carried out before mixing.

16. The sound insulation sheet according to claim 14, wherein:
a mixing condition comprises: a mixing temperature of 100 to 120° C., and a mixing time of 10 to 30 min;
an extruding condition comprises: an extruding temperature of 90 to 110° C.; and
a vulcanizing condition comprises: a vulcanizing temperature of 150 to 170° C., and a vulcanizing time of 6 to 10 min.

* * * * *